US009188210B2

United States Patent
Lin et al.

(10) Patent No.: US 9,188,210 B2
(45) Date of Patent: Nov. 17, 2015

(54) EXTERNAL CIRCULATION TYPE BALL SCREW DEVICE

(71) Applicant: HIWIN TECHNOLOGIES CORP., Taichung (TW)

(72) Inventors: Ming-Yao Lin, Taichung (TW); Po-Chuan Hau, Taichung (TW); Yan-Yu Chen, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 290 days.

(21) Appl. No.: 13/669,871

(22) Filed: Nov. 6, 2012

(65) Prior Publication Data

US 2014/0083224 A1    Mar. 27, 2014

(51) Int. Cl.
*F16H 25/22*    (2006.01)

(52) U.S. Cl.
CPC ....... *F16H 25/2214* (2013.01); *Y10T 74/19753* (2015.01)

(58) Field of Classification Search
CPC ............ F16H 25/2214; F16H 25/2219; F16H 25/2223
USPC ................ 74/424.82, 424.86, 424.87, 424.81
See application file for complete search history.

(56) References Cited

U.S. PATENT DOCUMENTS

| | | | | |
|---|---|---|---|---|
| 7,210,369 B2* | 5/2007 | Hartig et al. | ............... | 74/424.86 |
| 2003/0145670 A1* | 8/2003 | Fujita et al. | ................. | 74/89.44 |
| 2009/0071272 A1* | 3/2009 | Lin et al. | ...................... | 74/89.44 |
| 2010/0180707 A1* | 7/2010 | Wu | ............................ | 74/424.87 |
| 2012/0096967 A1* | 4/2012 | Liu et al. | .................... | 74/424.82 |

* cited by examiner

Primary Examiner — William C Joyce
Assistant Examiner — Thomas Magnuson
(74) Attorney, Agent, or Firm — Muncy, Geissler, Olds & Lowe, P.C.

(57) ABSTRACT

The invention provides an external circulation type ball screw device comprising screw shaft and nut having first and second screw grooves. A circulation member comprises first leg, second leg and connection portion. The first leg comprises a first end surface having first inner and outer points, and the second leg comprises a second end surface having second inner and outer points; first and second entrances formed on the first and second end surfaces of circulation passage; first and second thickness respectively provided between the first entrance and the first inner and outer points thereof; the second thickness being greater than the first; the third and fourth thickness respectively provided between the second entrance and the second inner and outer points thereof; the fourth thickness being greater than the third. The groove wall of the second screw groove occupied and the occurrence of broken teeth of the nut are reduced.

5 Claims, 17 Drawing Sheets

EXTERNAL CIRCULATION TYPE BALL SCREW DEVICE

BACKGROUND OF THE INVENTION

1. Technical Field

The present invention is related to a ball screw device, in particular, to an external circulation type ball screw device.

2. Description of Related Art

Ball screw device plays a significant part role in the field of linear transmissions, in which the configuration of the rolling balls can reduce the friction between the screw shaft and the nut such that the screw shaft and the nut can perform relative movements with each other rapidly and precisely.

As new mechanical structures are designed and built to be smaller in size, the volumes of the ball screws need to be confined in sizes as well in order to fit into such smaller spaces. Among a great number of ball screws, the external circulation type of ball screw is particularly suited to situations where limited spaces are available. As shown in FIGS. 1 to 3, a external circulation type ball screw device comprises a screw shaft 1, having an outer periphery provided with a first screw groove 2, a nut 3, having a through-hole 4 and an inner periphery thereof provided with a second screw groove 5 opposing said first screw groove 2 of said screw shaft 1. And a rolling path form between said first screw groove 2 and said second screw groove 5. A plurality of rolling members 6 are confined to move within the rolling path. As the screw shaft 1 (or the nut 3) is rotated, the rolling members 6 are rolled to drive the nut 3 (or the screw shaft 1) to move axially. Furthermore, a circulating tube 7 inserted into the nut 3 comprises two ends connected to the first screw groove 2 and the second screw groove 5 respectively. After the rolling members 6 move along the bearing path and enter into the circulating tube 7, they would return back to the rolling path again, forming an endless circulation. It shall be noted that during the operation of the ball screw device, the rolling members are not passing through the entire second screw groove, and for the portion of the second screw groove where the rolling members pass through is called an effective thread zone (E.T.Z.). During the operation of the ball screw device, the effective thread zone is required to bear the force exerted by the rolling members. On the other hand, for the portion of the second screw groove where no rolling members pass through is called an invalid thread zone (I.T.Z) which bears no forces exerted by the rolling members.

However, as shown in FIG. 2 and in the abovementioned external circulation type ball screw device, the circulating tube 7 penetrates through the nut 3 and is connected to the bearing path such that the tube wall of the circulating tube 7 to occupies the groove wall effective thread zone of the second screw groove 5 in the nut 3, causing the groove wall to be thinner and as a result and making the effective thread zone of the second screw groove 5 vulnerable to groove wall collapsing as well as the problem of broken teeth of the nut.

SUMMARY OF THE INVENTION

The present invention has been accomplished under the circumstances in view. It is the main object of the present invention to provide an external circulation type ball screw device, which reduces occurrence of broken teeth of the nut.

To achieve this and other objects of the present invention, An external circulation type ball screw device, comprising a screw shaft, having an outer periphery provided with a first screw groove; a nut, having a through-hole and an inner periphery thereof provided with a second screw groove opposing said first screw groove of said screw shaft; a circulation member, having a first leg and a second leg provided on two ends thereof respectively and a connection portion connecting said first leg and second leg, said first leg comprising a first end surface having a first inner point and a first outer point, said second leg comprising a second end surface having a second inner point and a second outer point, a circulating passage provided at an internal of said circulation member, said circulating passage penetrating said first leg, said connection portion and said second leg, a first entrance and a second entrance formed on said first end surface and said second end surface respectively and connected to said second screw groove, a first thickness provided between said first entrance and said first inner point, a second thickness provided between said first entrance and said first outer point, said second thickness being triple or more than said first thickness, a third thickness provided between said second entrance and said second inner point, a fourth thickness provided between said second entrance and said second outer point, said fourth thickness being triple or more than said third thickness, said first leg and said second leg penetrating said nut, said first leg having a first tongue protruding outward to said first screw groove, said second leg having a second tongue protruding outward to said first screw groove; and a plurality of rolling members, restricted to a rolling path form between said first screw groove and said second screw groove or confined to move within said circulating passage.

In accordance with the external circulation type ball screw device of the present invention, the first entrance is closer to the first inner point in comparison to known arts and, therefore, less groove wall of the second screw groove in the effective thread zone is occupied and such that the occurrence of broken teeth of the nut is reduced.

DESCRIPTION OF EMBODIMENTS OF THE INVENTION

Figure 1:
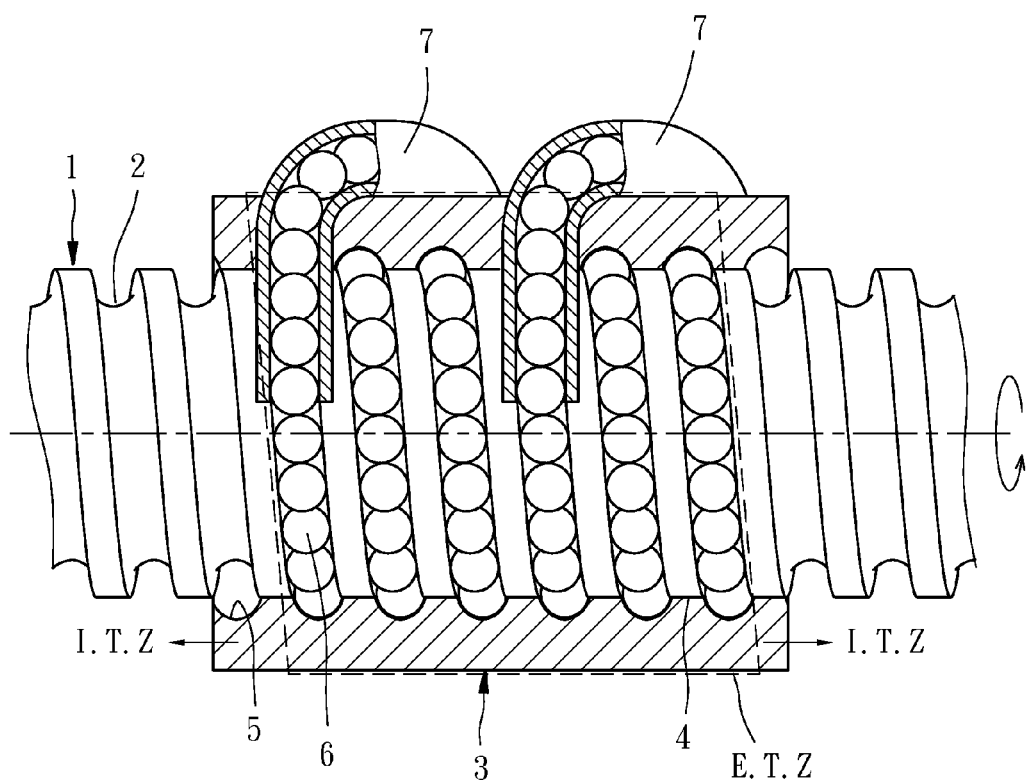
FIG. 1 is a known external circulation type ball screw device.
Figure 2:
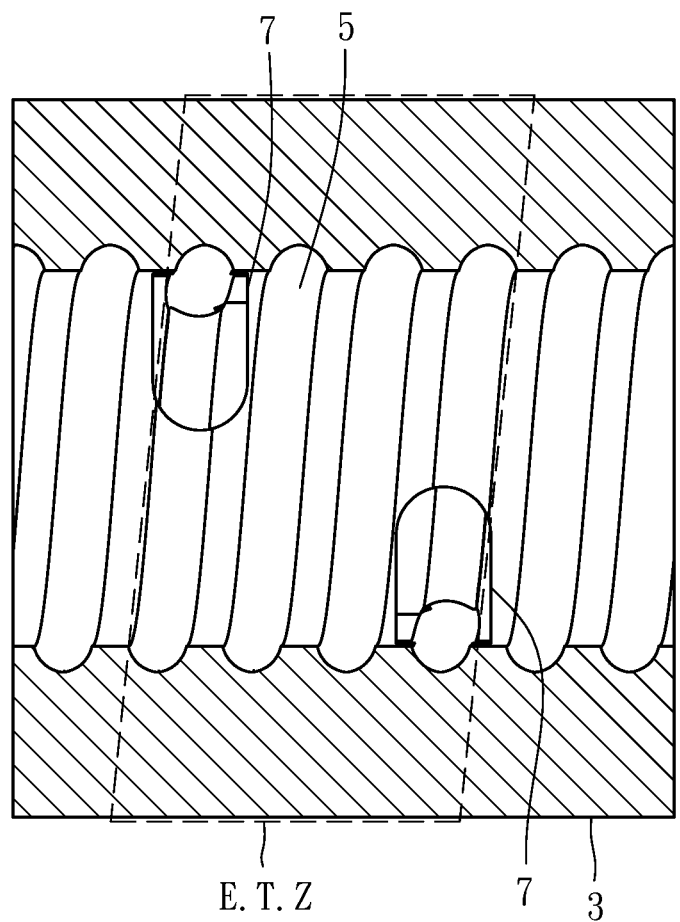
FIG. 2 is a cross sectional view of the known external circulation type ball screw device, showing a cross section of the nut thereof.
Figure 3:
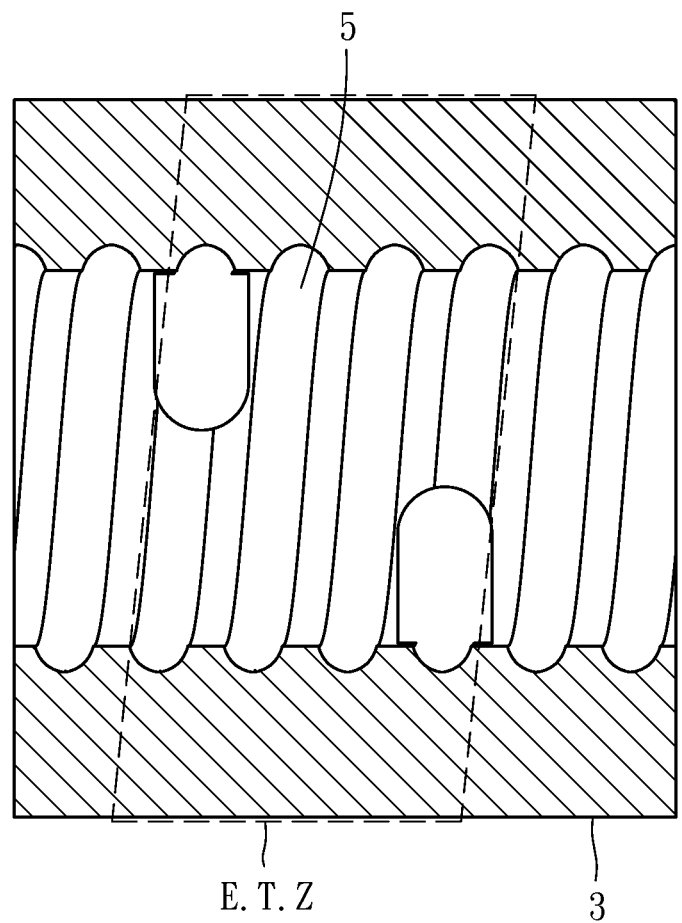
FIG. 3 is a cross sectional view of the known external circulation type ball screw device, showing a cross section of the nut without circulating tube thereof.
Figure 4:
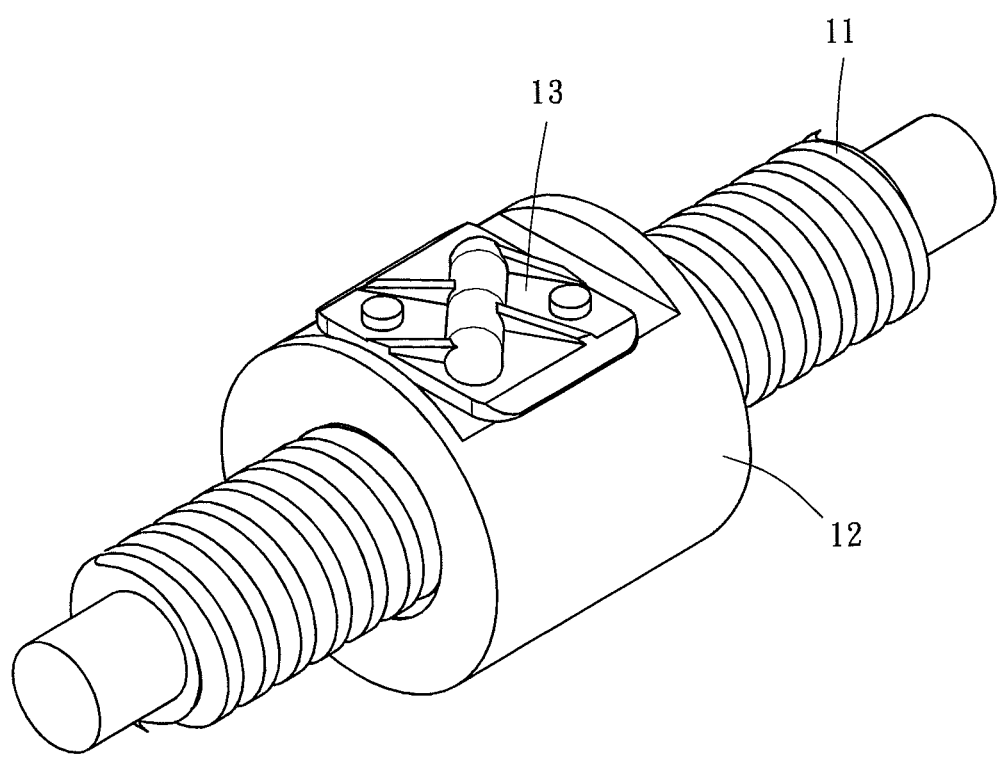
FIG. 4 is a perspective view of the first preferred embodiment of the present invention.
Figure 5:
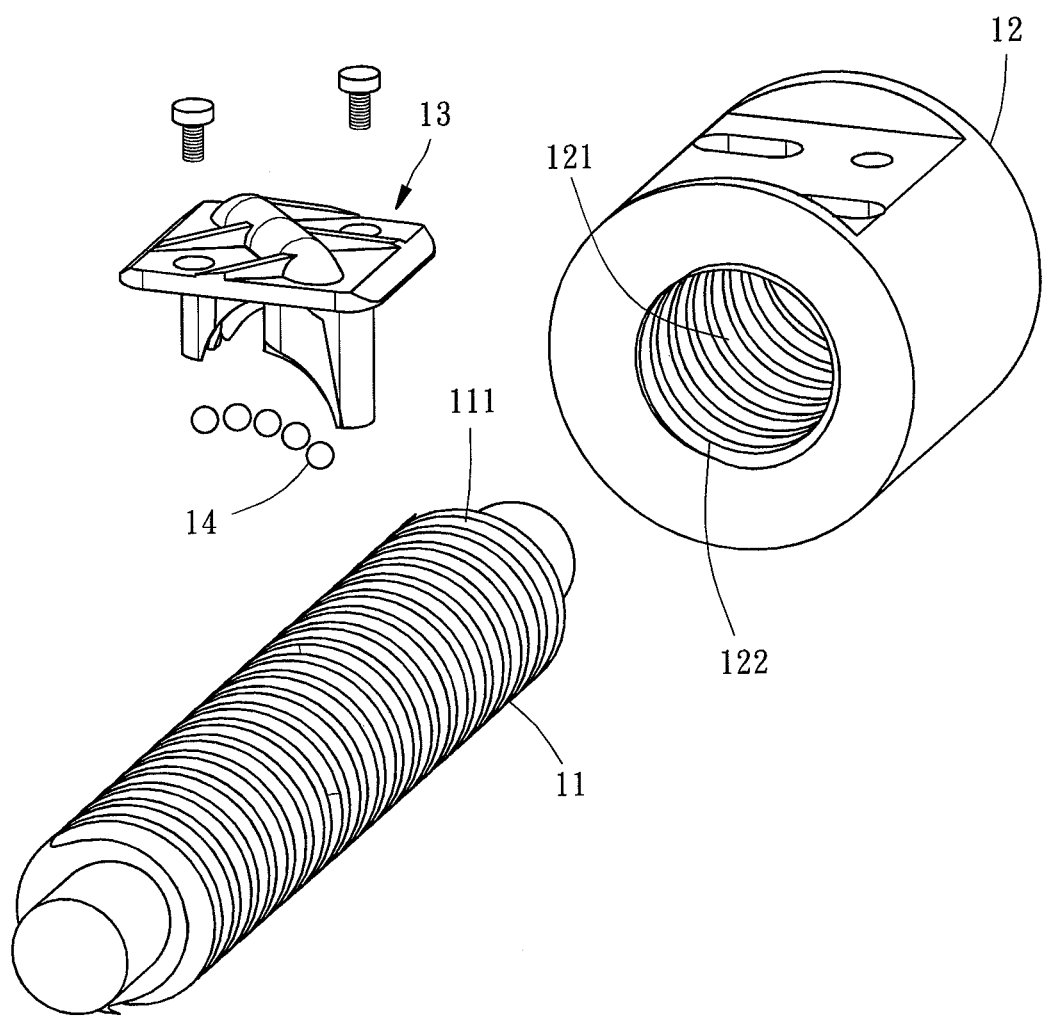
FIG. 5 is an exploded view of the first preferred embodiment of the present invention.
Figure 6:
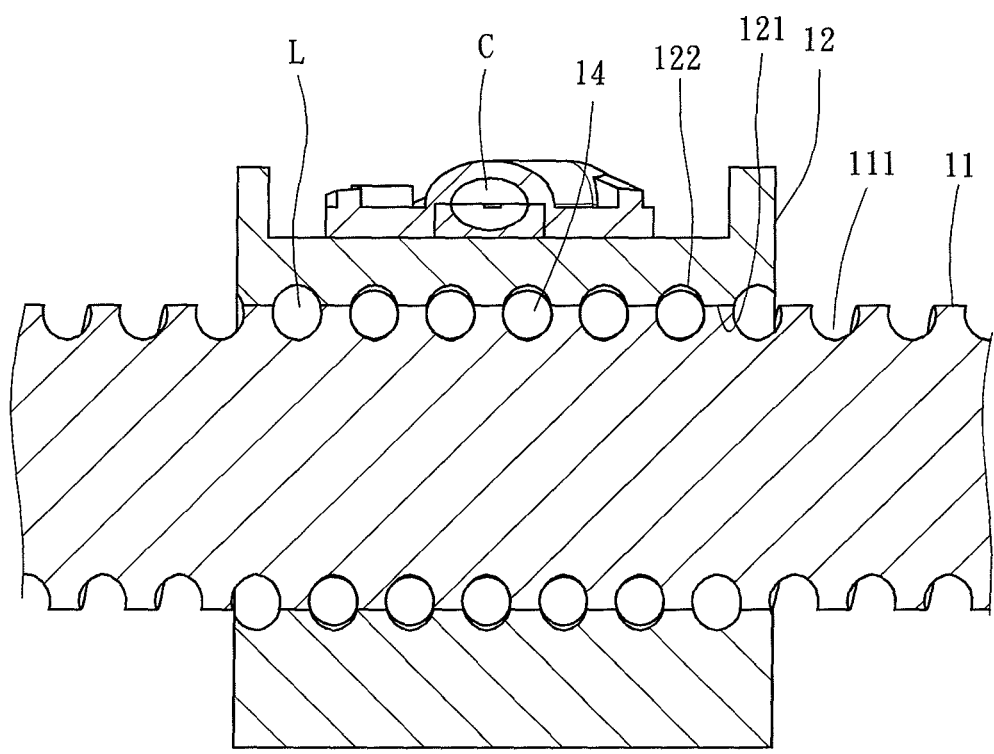
FIG. 6 is a cross sectional view of the first preferred embodiment of the present invention.
Figure 7:
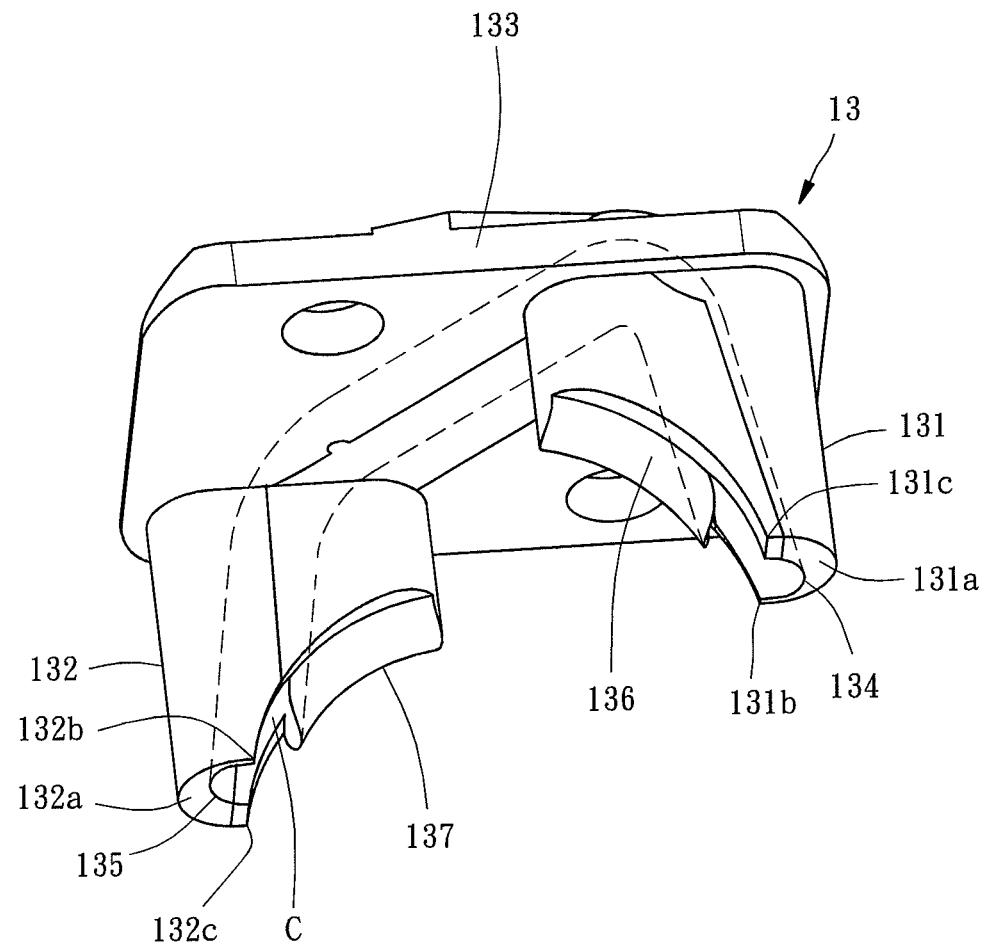
FIG. 7 is a perspective view of the assembly part of the first preferred embodiment of the present invention, showing the circulation member.
Figure 8:
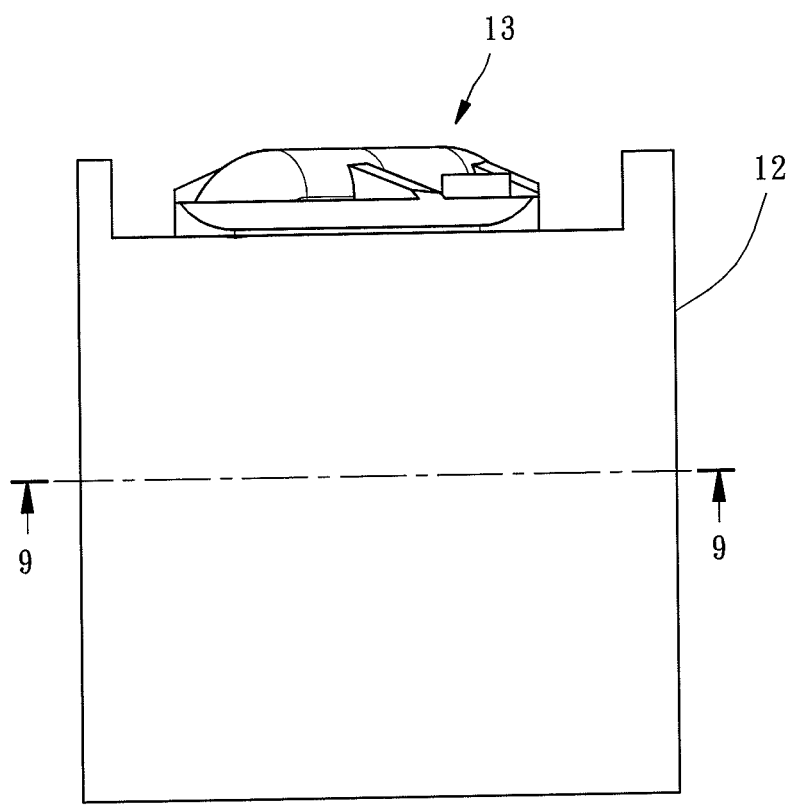
FIG. 8 is a front view of the assembly part of the first preferred embodiment of the present invention, showing the nut and the circulation member.
Figure 9:
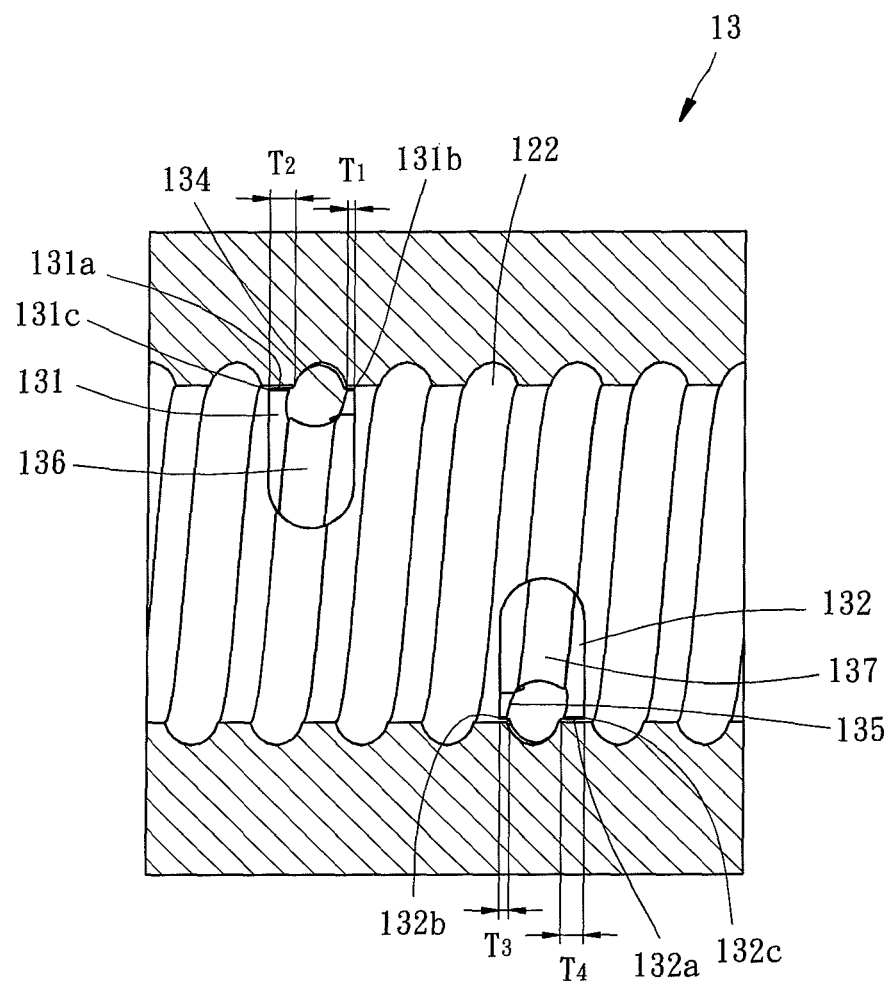
FIG. 9 is a cross sectional view of the assembly part in FIG. 7 alone the line 8-8, showing the nut.
Figure 10:
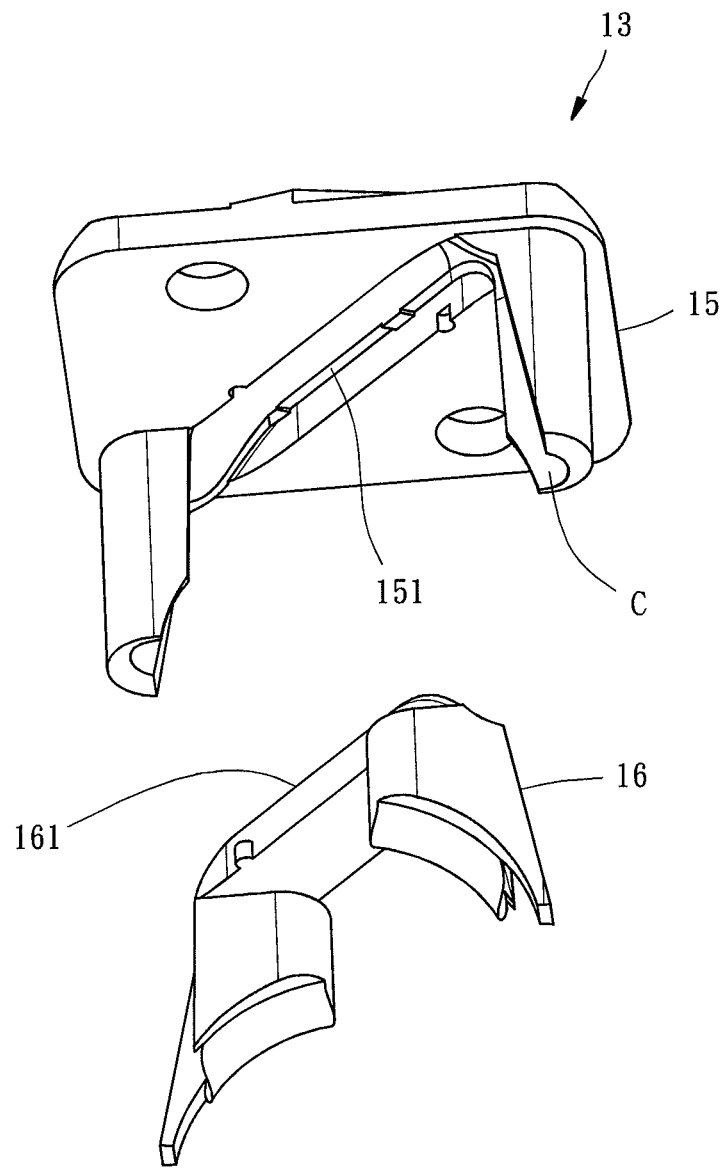
FIG. 10 is an exploded view of the assembly part of the first preferred embodiment of the present invention.

To describe the technical features of the present invention in greater detail, a preferred embodiment of the present invention is provided below along with the accompanied drawings accordingly in the following.

As shown in FIGS. 4~10, a first embodiment of the present invention provides an external circulation type ball screw device, comprising: a screw shaft 11, a nut 12, a circulation member 13 and a plurality of rolling members 14.

The screw shaft 11, having an outer periphery provided with a first screw groove 111.

The nut 12 having a through-hole 121 and an inner periphery thereof provided with a second screw groove 122 opposing to said first screw groove 111 of said screw shaft 11.

The circulation member 13 comprises a first leg 131 and a second leg 132 provided on two ends thereof respectively and a connection portion 133 connecting said first leg 131 and second leg 132. Said first leg 131 comprises a first end surface 131a having a first inner point 131b and a first outer point 131c, and said second leg 132 comprises a second end surface 132a having a second inner point 132b and a second outer point 132c. A circulating passage C is provided at an internal of said circulation member 13, and said circulating passage C penetrates said first leg 131, said connection portion 133 and said second leg 132, and a first entrance 134 and a second entrance 135 are formed on said first end surface 131a and said second end surface 132a respectively and connected to said second screw groove 122. The outer contours of the first entrance 134 and the second entrance 135 are generally of a U shape.

In the first embodiment of the present invention, a first thickness T1 is provided between said first entrance 134 and said first inner point 131b, and a second thickness T2 is provided between said first entrance 134 and said first outer point 131c. Said second thickness T2 is triple or more than said first thickness T1. A third thickness T3 is provided between said second entrance 135 and said second inner point 132b, and a fourth thickness T4 is provided between said second entrance 135 and said second outer point 132c. Said fourth thickness T4 is triple or more than said third thickness T3.

The first leg 131 and the second leg 132 penetrate said nut 12. In addition, said first leg 131 comprises a first tongue 136 protruding outward to said first screw groove 111, and said second leg 132 comprises a second tongue 137 protruding outward to said first screw groove 111.

The plurality of rolling members 14 are restricted to a rolling path L form between said first screw groove 111 and said second screw groove 122 or confined to move within said circulating passage C.

It shall be noted that during the operation of the ball screw device, the rolling members 14 are not passing through the entire second screw groove 122, and for the portion of the second screw groove 122 where the rolling members 14 pass through is called an effective thread zone (E.T.Z.). During the operation of the ball screw device, the effective thread zone is required to bear the force exerted by the rolling members 14. On the other hand, for the portion of the second screw groove where no rolling members 14 pass through is called an invalid thread zone (I.T.Z) which bears no forces exerted by the rolling members 14.

In accordance with the abovementioned first embodiment of the external circulation type ball screw device of the present invention, the first entrance 134 is closer to the first inner point 131b in comparison to known arts and, therefore, less groove wall of the second screw groove 122 in the effective thread zone is occupied and such that the occurrence of broken teeth of the nut is reduced.

It shall be noted that in this preferred embodiment of the present invention, the circulation member 13 is divided into a main body 15 and an attachment part 16 along said circulating passage C. Said main body 15 and said attachment part 16 comprise an attachment surface 151, 161 respectively. Said main body 15 and said attachment part 16 are assembled along said two attachment surfaces 151, 161 to form said circulation member 13. The main body 15 and the attachment part 16 are formed first and followed by the assembly of the attachment surfaces 151, 161 to form the circulation member 13 in order to facilitate the manufacturing of the circulation member 13.

Figure 11:
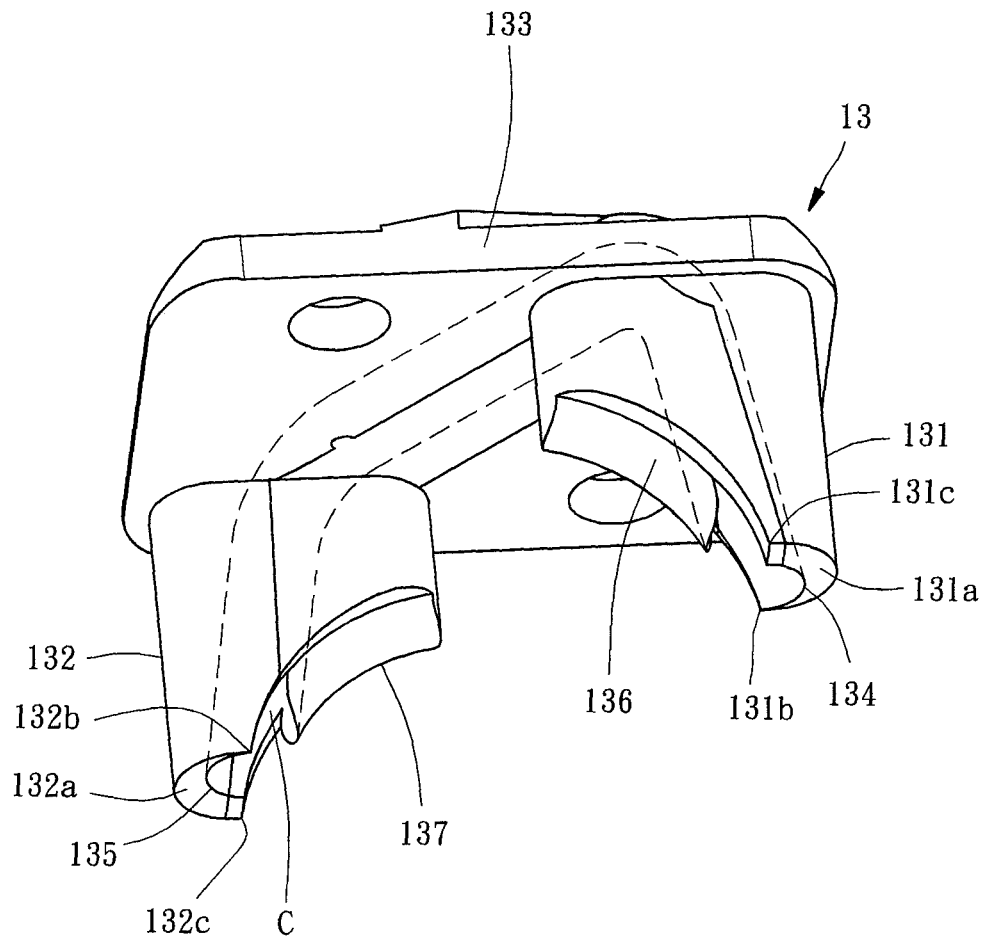
FIG. 11 is a perspective view of the assembly part of the second preferred embodiment of the present invention, showing the circulation member.
Figure 12:
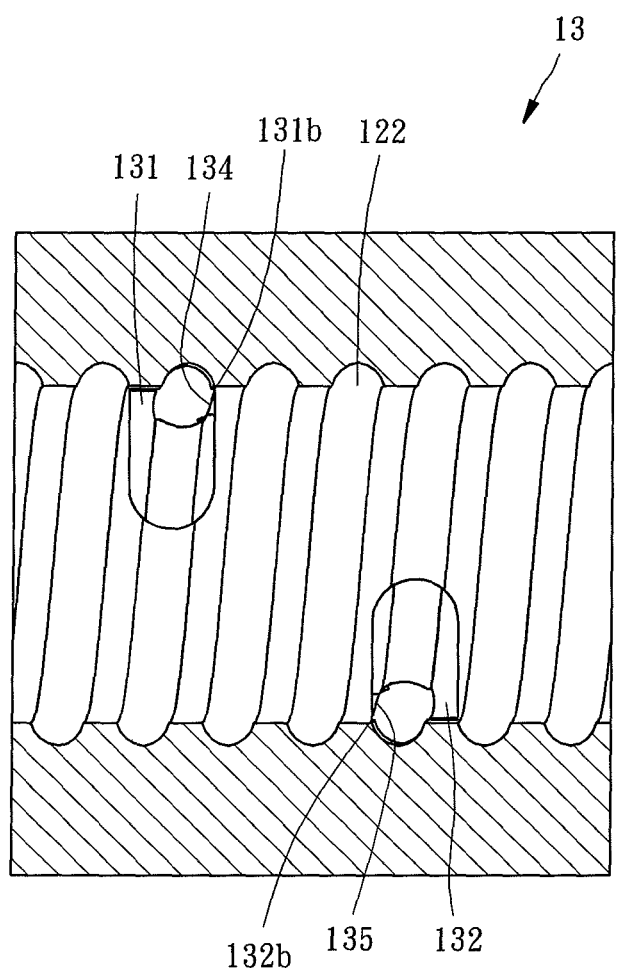
FIG. 12 is a cross sectional view of the assembly part of the second preferred embodiment of the present invention, showing the nut.

As shown in FIGS. 11~12, a second embodiment of the present invention provides an external circulation type ball screw device, which differs from the first embodiment in that: said first entrance 134 is passes through said first inner point 131b, and said second entrance 135 is passes through said second inner point 132b.

In accordance to the abovementioned second preferred embodiment of the external circulation type ball screw device of the present invention, said first entrance 134 is directly passes through said first inner point 131b, and said second entrance 135 is directly passes through said second inner point 132b. The outer contours of the abovementioned first entrance 134 and the second entrance 135 are of a U shape. The features of said first entrance 134 directly passes through said first inner point 131b and said second entrance 135 directly passes through said second inner point 132b are referring to that the U shaped contours of the first inner point 131b and the second inner point 132b passes through each other and such that less groove wall of the second screw groove 122 in the effective thread zone is occupied and the occurrence of broken teeth of the nut is reduced.

Figure 13:
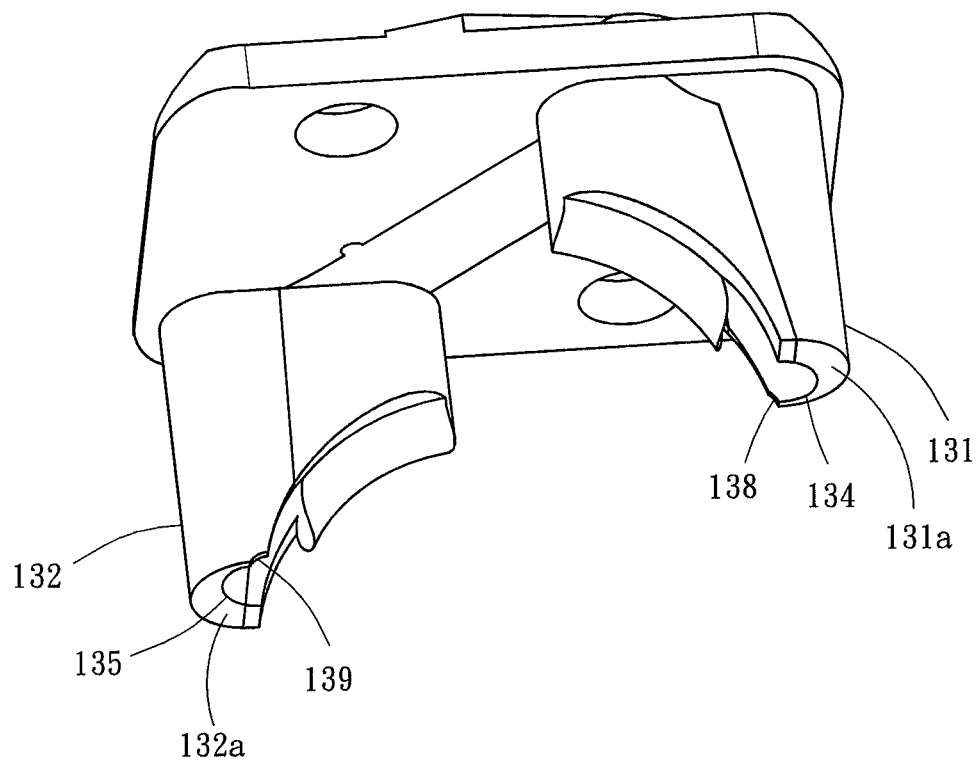
FIG. 13 is a perspective view of the assembly part of the third preferred embodiment of the present invention, showing the circulation member.
Figure 14:
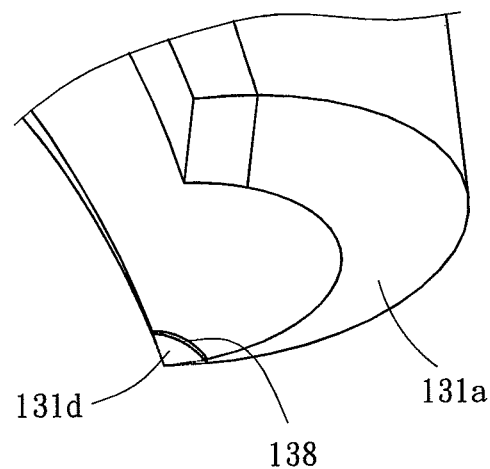
FIG. 14 is a partial enlarged view of the assembly part of the third preferred embodiment of the present invention, showing the first leg of the circulation member.
Figure 15:
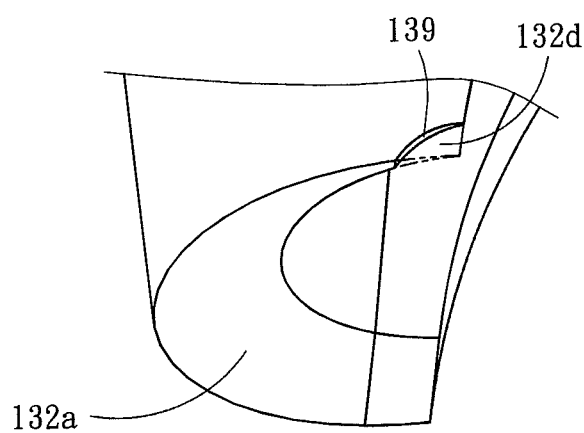
FIG. 15 is a partial enlarged view of the assembly part of the third preferred embodiment of the present invention, showing the second leg of the circulation member.
Figure 16:
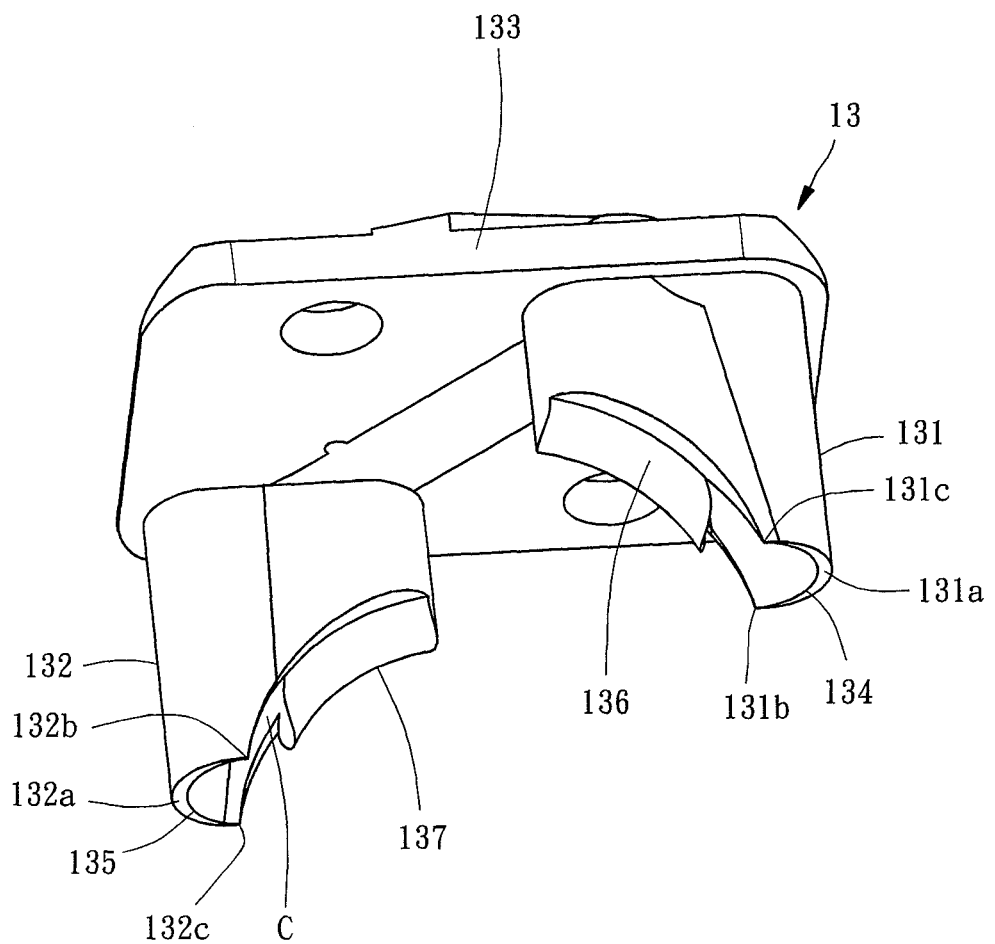
FIG. 16 is a perspective view of the assembly part of the third preferred embodiment of the present invention, showing the first entrance passes through the first external end point and the second entrance passes through the second external end point.
Figure 17:
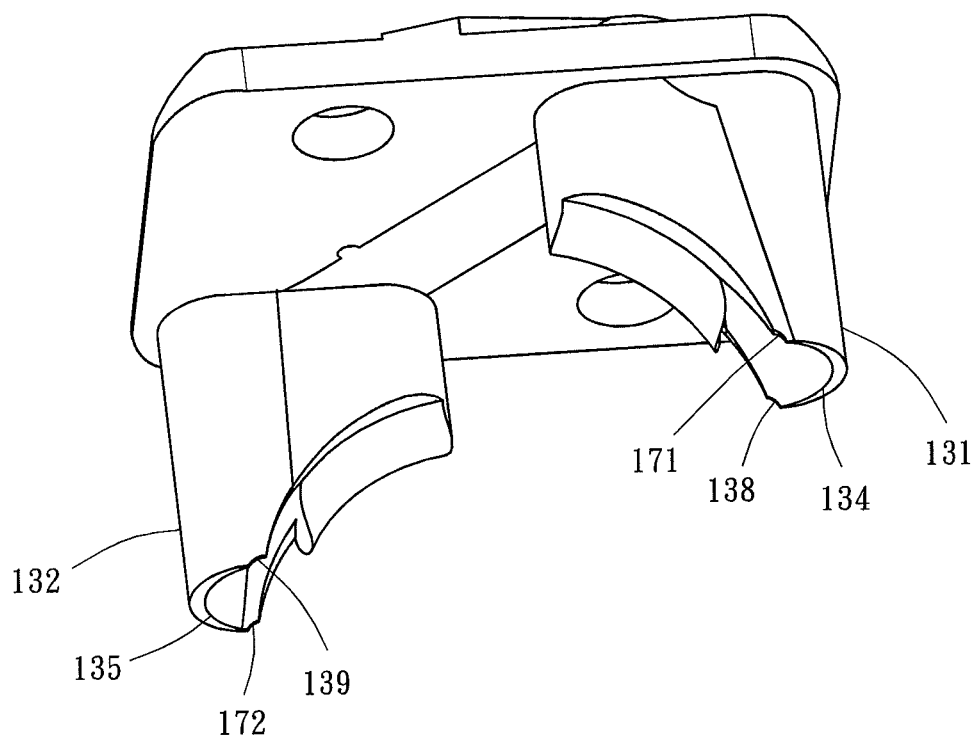
FIG. 17 is a perspective view of the assembly part of the third preferred embodiment of the present invention, showing the circulation member and showing the first leg forming the third opening at the first end surface and the second leg forming the fourth opening at the second end surface.
Figure 18:
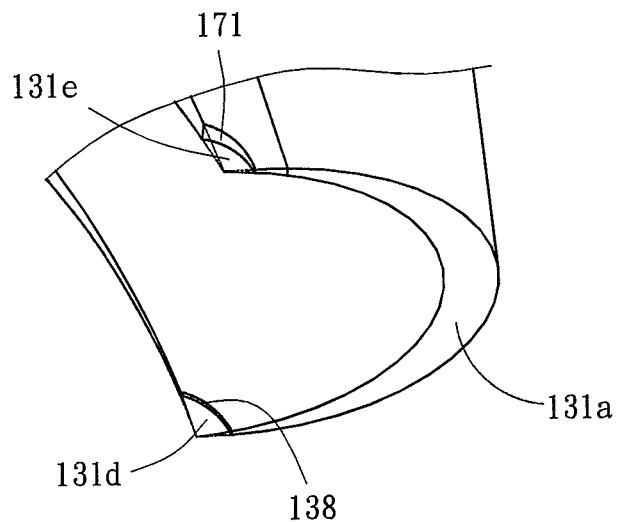
FIG. 18 is a partially enlarged view of the assembly part of the third preferred embodiment of the present invention, showing the first leg of the circulation member.
Figure 19:
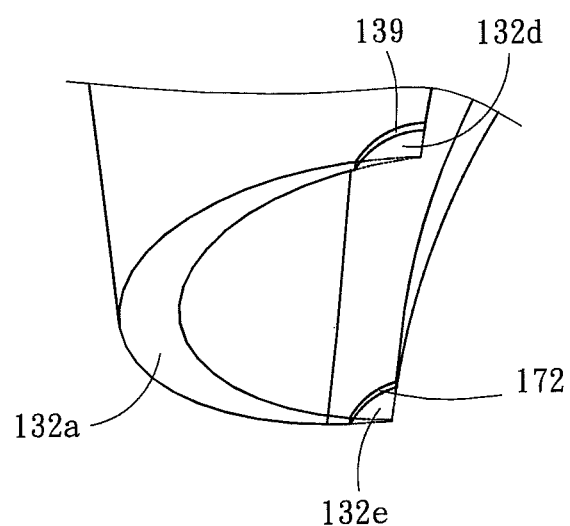
FIG. 19 is a partially enlarged view of the assembly part of the third preferred embodiment of the present invention, showing the second leg of the circulation member.

As shown in FIGS. 13~15, a third embodiment of the present invention provides an external circulation type ball screw device, which differs from the first embodiment in that: a first cut-out portion 131d is trimmed off from the first end surface 131a of the first leg 131 to form a first opening 138 connecting said first entrance 134 and an inner side of said first leg 131, and a second cut-out portion 132d is trimmed off from the second end surface 132a of said second leg 132 to form a second opening 139 connecting said second entrance 135 and an inner side of said second leg 132.

In accordance to the abovementioned third preferred embodiment of the external circulation type ball screw device of the present invention, as the first entrance 134 and the second entrance 135 are not affecting the rolling members 14, this embodiment is able to further reduce the groove wall of the second screw groove 122 in the effective thread zone being occupied and to further reduce the occurrence of broken teeth of the nut in comparison to the first and second preferred embodiments.

As shown in FIGS. 16~19, it shall be noted that according to the all of the preferred embodiments mentioned above, in order to further reduce the size of the circulation member 13, the first entrance 134 can be passes through the first external point 131c and the second entrance 135 can be passes through the second external point 132 C. Alternatively, a third cut-out portion 131e can be trimmed off from the first end surface 131a of the first leg 131 to form a third opening 171 connecting said first entrance 134 and an outer side of said first leg 131, and a fourth cut-out portion 132e can be trimmed off from the second end surface 132a of said second leg 132 to form a fourth opening 172 connecting said second entrance 135 and an outer side of said second leg 132.

What is claimed is:

1. An external circulation type ball screw device, comprising:
    a screw shaft, having an outer periphery provided with a first screw groove;
    a nut, having a through-hole and an inner periphery thereof provided with a second screw groove opposing said first screw groove of said screw shaft;
    a circulation member, having a first leg and a second leg provided on two ends thereof respectively and a connection portion connecting said first leg and second leg, said first leg comprising a first end surface having a first inner point, said second leg comprising a second end surface having a second inner point, a circulating passage provided at an internal of said circulation member, said circulating passage penetrating said first leg, said connection portion and said second leg, a first entrance and a second entrance formed on said first end surface and said second end surface respectively and connected to said second screw groove, said the first inner point lying on a periphery of the first entrance, the second inner point lying on a periphery of the second entrance, said first leg and said second leg penetrating said nut, said first leg having a first tongue protruding outward to said first screw groove, said second leg having a second tongue protruding outward to said first screw groove; and
    a plurality of rolling members, restricted to a rolling path formed between said first screw groove and said second screw groove or confined to move within said circulating passage,
    wherein the first inner point is a point formed on an intersection of an outer circumferential surface of the first leg and the first end surface and located between rolling members,
    wherein the second inner point is a point formed on intersection of an outer circumferential surface of the second leg and the second end surface and located between the rolling members, and wherein said first end surface of said first leg is formed of a third opening connecting said first entrance and an outer side of said first leg, said second end surface of said second leg is formed of a fourth opening connecting said second entrance and an outer said of said second leg.

2. The external circulation type ball screw device as claimed in claim 1, wherein said circulation member is divided into a main body and an attachment part along said circulating passage, said main body and said attachment part comprise an attachment surface respectively, said main body and said attachment part assembled along said two attachment surfaces to form said circulation member.

3. The external circulation type ball screw device as claimed in claim 1, wherein said first end surface of said first leg comprises a first outer point, said second end surface of said second leg comprises a second outer point, the first outer point lies on the periphery of the first entrance, and the second outer point lies on the periphery of the second entrance,
    wherein the first outer point is a point formed on the intersection of the outer circumferential surface of the first leg and the first end surface and located outside the rolling members, and
    wherein the second outer point is a point formed on the intersection of the outer circumferential surface of the second leg and the second end surface and located outside the rolling members.

4. An external circulation type ball screw device, comprising:
    a screw shaft, having an outer periphery provided with a first screw groove;
    a nut, having a through-hole and an inner periphery thereof provided with a second screw groove opposing said first screw groove of said screw shaft;
    a circulation member, having a first leg and a second leg provided on two ends thereof respectively and a connection portion connecting said first leg and second leg, said first leg comprising a first end surface, said second leg comprising a second end surface, a circulating passage provided at an internal of said circulation member, said circulating passage penetrating said first leg, said connection portion and said second leg, a first entrance and a second entrance formed on said first end surface and said second end surface respectively and connected to said second screw groove, a first opening connecting said first entrance and an inner side of said first leg, a second opening connecting said second entrance and an inner side of said second leg, said first leg and said second leg penetrating said nut, said first leg having a first tongue protruding outward to said first screw groove, said second leg having a second tongue protruding outward to said first screw groove; and
    a plurality of rolling members, restricted to a rolling path formed between said first screw groove and said second screw groove or confined to move within said circulating passage,
    wherein said first end surface of said first leg comprises a first outer point, said second end surface of said second leg comprises a second outer point, the first outer point lies on a periphery of the first entrance, and the second outer point lies on a periphery of the second entrance,
    wherein the first outer point is a point formed on an intersection of an outer circumferential surface of the first leg and the first end surface and located outside the rolling members,
    wherein the second outer point is a point formed on an intersection of the outer circumferential surface of the second leg and the second end surface and located outside the rolling members, and
wherein said first end surface of said first leg is formed of a third opening connecting said first entrance and an outer side of said first leg, said second end surface of said second leg is formed of a fourth opening connecting said second entrance and an outer said of said second leg.

5. The external circulation type ball screw device as claimed in claim 4, wherein said circulation member is divided into a main body and an attachment part along said circulating passage, said main body and said attachment part comprise an attachment surface respectively, said main body and said attachment part assembled along said two attachment surfaces to form said circulation member.

* * * * *